United States Patent Office 3,135,818
Patented June 2, 1964

3,135,818
VARIABLE FOCAL LENGTH LENS SYSTEM
Eugene Turula and Geraldine B. Lynch, both of Rochester, N.Y., assignors, by mesne assignments, to Minnesota Mining and Manufacturing Company, St. Paul, Minn., a corporation of Delaware
Filed Sept. 29, 1961, Ser. No. 141,766
6 Claims. (Cl. 88—57)

This invention relates to a lens system of variable focal length or variable magnification power, and particularly to such a system in a form suitable for use in a hand-held motion picture camera for amateur use. Although this is the preferred field, the invention is not limited in its usefulness to this particular field, as it is useful also in an optical system for television camera lenses, projection lenses, zoom binocular lenses, etc.

An object of the invention is the provision of a generally improved and more satisfactory lens system of this character.

Another object is the provision of a lens system which is exceptionally well corrected for spherical aberration, as well as having improvement in the correction of other aberrations, such as astigmatism, lateral color, axial color, coma, and distortion, as compared with the correction of these aberrations as found in comparable lenses of the prior art.

Still another object is the provision of a compact lens system that can be readily incorporated into the conventional hand-held amateur motion picture cameras and at the same time can provide the user with a lens system having the characteristics of a wide angle, a normal, and a telephoto lens, as well as having the zoom characteristics of maintaining a fixed image plane, and the characteristics of maintaining correction of aberrations and a constant relative aperture throughout its range of adjustment.

A further object is the provision of a zoom lens system whose optical components as well as mechanical mountings are inexpensive and can be readily incorporated into motion picture cameras.

A still further object is the provision of a lens system fulfilling some or all of the objects mentioned above, and being so designed as to have adequate space to incorporate an automatic diaphragm operated by a photoelectric cell, and space to incorporate a viewfinder of the through-the-lens type.

These and other desirable objects may be attained in the manner disclosed as an illustrative embodiment of the invention in the following description and in the accompanying drawings forming a part hereof, in which.

Figure 1:
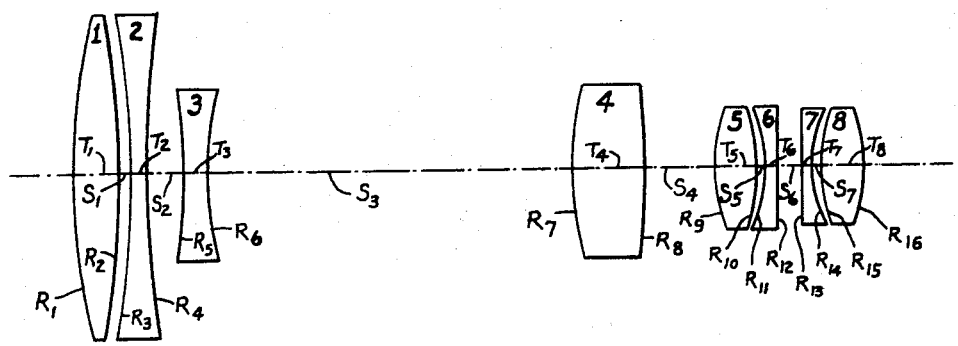
FIG. 1 is a diagrammatic representation of a lens system according to a preferred embodiment of the present invention.

The lens system of the present invention may be regarded as composed of a front member or portion and a rear member or portion, each of these members comprising a plurality of individual lens elements. The front member has four air-spaced elements or individual lenses, some of which are movable relative to each other as explained below. The rear member, in the specific example, also has four air-spaced elements, which remain in fixed position relative to each other.

In the following disclosure and in the claims, the individual lens elements are numbered 1 to 8, consecutively from front to rear. Thus elements 1 to 4 comprise the front member, and elements 5 to 8 comprise the rear member. Elements 1 and 2 remain fixed relative to each other, so far as zoom movement is concerned, though they may be moved relative to each other for focusing. They may be referred to as a first group or front group. Element 3 may be called the second or intermediate group, and element 4 may be called the third or rear group of the front member, since in optical parlance the word "group" does not necessarily imply two or more elements, but may consist of only a single element, as here.

The three groups of the front member constitute two positive groups (the first and third) separated by a negative group (the second) which remains axially stationary, while the two positive groups move axially in unison with each other for zoom purposes, to vary the magnification power and the equivalent focal length of the system. The front member produces a real image in a fixed image plane, and this image in turn provides an object for the rear member at a constant object distance, resulting in a fixed focal plane for the entire system, regardless of the adjusted positions of the lens groups of the front member.

In order to attain all of the advantages and fulfill all of the above stated objects of the invention, it is preferred to use the front member in combination with a rear member constructed substantially in accordance with the specific exemplary disclosure herein given. However, in view of the above mentioned fact that the front member provides an image in a fixed plane, to be used as the object of the rear member, it will be understood by those skilled in the art that great variations in the construction of the rear member are possible, while still utilizing the advantages of the disclosed construction of the front member. Thus the rear member may be a photographic objective of any suitable focal length, either simpler or more complex than the specific example here given, and containing either less or more than the four lens elements used in the specific example, and suitably designed to compensate for the aberrations of the lens system preceding it. Stating it another way, the present invention may be regarded as having two aspects: a broad aspect comprising the front member as herein disclosed, for use in combination with any suitable rear member; and a narrower preferred aspect comprising the front member in combination with the particular rear member herein disclosed.

In the following disclosure and in the accompanying claims, the radii of curvature R, the axial thickness T of the lens elements, and the spacings S between elements, are all expressed in the customary manner, with the usual numerical subscripts indicating the particular surface, lens thickness, or air space, separately numbered in sequence from front to rear. The plus and minus values of the radii R indicate surfaces respectively convex and concave toward the front, in accordance with conventional notation, and a radius of infinity means a plant surface. The respective refractive indices, expressed with reference to the spectral D line of sodium, are indicated by N. The dispersive indices or Abbe numbers are indicated by V.

The focal lengths of various individual lens elements are indicated by F with a numerical subscript corresponding to the number of the particular lens element, from 1 to 8. $F_9$ indicates the equivalent focal length of the front group (elements 1 and 2). $F_{10}$ indicates the equivalent focal length of the entire front member (elements 1 to 4) when adjusted to its shortest focal length limit. $F_{11}$ indicates the equivalent focal length of the entire front member when adjusted to its longest focal length limit. $F_{12}$ indicates the equivalent focal length of the entire rear member, that is, elements 5 to 8 in the specific example, but possibly more or less than four elements if an alternative rear member is used as explained above.

One of the features of the present invention is that a buried surface (or the equivalent thereof) is incorporated in the first positive lens group, which substantially improves the lateral color correction. A buried surface, as the term is used here, means that the adjacent faces of two adjacent lens elements of opposite power, one positive and one negative, have exactly mating curvatures and that these two elements are made of two glasses whose indices of refraction N for the sodium D line are substantially the same, but whose dispersive indices V are different. Frequently the term buried surface is restricted to those situations where the two lens elements have their faces in actual contact with each other throughout their areas. But in the present construction, where there is a slight space or air gap $S_1$ between the two surfaces (variable, for focusing purposes, from about 0.7 mm. to several millimeters) the surfaces function for color correction purposes in substantially the same way they would if there were no air gap. So this construction is the equivalent of one which meets the technical definition of a buried surface in its narrowest sense, and the term buried surface is therefore used in this patent application in a slightly broader sense, without regard to the presence or absence of an air gap between the two surfaces of mating curvature, equal or nearly equal refractive indices, and different dispersive indices.

In the preferred construction, the buried surface is between the two elements 1 and 2 which together constitute the first group. The fact that the buried surface is not cemented and that the two elements need not be in contact with each other, permits the front positive element 1 by itself to be moved axially for focusing at a finite distance. This is a decided advantage, because the focal length of element 1 alone is much shorter than the equivalent focal length of the first group consisting of elements 1 and 2 together. Hence the extent of axial movement required for focusing for a given finite distance is much less, when focusing is accomplished by moving merely element 1, than it would be if focusing were accomplished by joint movement of elements 1 and 2, as would be necessary of elements 1 and 2 were in the form of a cemented doublet, for example.

This may be illustrated by specific dimensions, using the formula $$M = \frac{F^2}{B - 2F}$$

where M is the axial movement (forwardly from the infinity-focused position) required in order to focus the lens on an object at a distance B as measured from the rear focal plane of the element or component which is to be moved axially for focusing purposes, the focal length of which movable element or component is F. If focusing is accomplished by moving only the front positive element 1, whose focal length is 55.84 mm., then the forward focusing movement of the element, from its infinity focused position, in order to focus on an object distance of 3 feet, is 3.88 mm., or 0.153 of an inch. But if elements 1 and 2 were cemented to form a doublet, then on account of the much greater focal length of the doublet the focusing movement required (to focus for an object distance of 3 feet) would be about 14.54 mm., or 0.572 of an inch.

It is found that the above mentioned objects of the invention are well fulfilled, and excellent results are obtained, when the variables of radii and of focal length are kept substantially within the limits indicated by the algebraic inequalities in the following table.

*Table 1*

$+0.412F_9 < F_1 < +0.686F_9$
$-0.884F_9 < F_2 < -1.474F_9$
$-0.236F_9 < F_3 < -0.393F_9$
$+0.281F_9 < F_4 < +0.468F_9$
$+1.544F_{10} < F_9 < +2.574F_{10}$
$+0.647F_{11} < F_9 < +1.079F_{11}$
$+0.383F_9 < R_1 < +0.638F_9$
$-0.737F_9 < R_2 < -1.229F_9$
$-0.737F_9 < R_3 < -1.229F_9$
$+2.110F_9 < R_4 < +3.516F_9$
$+1.118F_3 < R_5 < +1.863F_3$
$-0.612F_3 < R_6 < -1.020F_3$
$+0.512F_4 < R_7 < +0.854F_4$
$-1.281F_4 < R_8 < -2.135F_4$
$+0.525F_{12} < R_9 < +0.875F_{12}$
$-0.638F_{12} < R_{10} < -1.063F_{12}$
$-0.477F_{12} < R_{11} < -0.795F_{12}$
$+0.250F_{12} < R_{12} \leq \infty$
$-0.250F_{12} < R_{13} \leq \infty$
$+0.376F_{12} < R_{14} < +0.626F_{12}$
$+0.525F_{12} < R_{15} < +0.875F_{12}$
$-0.525F_{12} < R_{16} < -0.875F_{12}$ A specific example of a lens whose variables fall within the above-mentioned limits and which meets all of the outlined requirements may be constructed in accordance with the numerical data given in the following Table 2, wherein all linear dimensions are given in millimeters. Diameters of the individual lens elements are given in the column headed D. The various other symbols have the meanings already explained above.

The space $S_1$ as given in the following Table 2 represents this space when the lens is in the infinity-focused position. As already noted above, this space $S_1$ is increased by moving element 1 forwardly relative to element 2, when the lens is to be focused on an object closer than infinity, but $S_1$ does not vary during the zooming movement. The spaces $S_2$ and $S_3$ and $S_4$ do vary during the zooming movement, in such a way that the sum of $S_2$ plus $S_3$ is a constant which may be called K, and the sum of $S_3$ plus $S_4$ is a constant which may be called C. In the specific example, K is 31.46 mm., and C is 34.22 mm. Thus instead of giving the values of $S_3$ and $S_4$ in the way in which they are given in following Table 2, it would be equally correct to say that $S_3$ is 31.46 minus $S_2$, and that $S_4$ is 34.22 minus $S_3$, or to say that $S_4$ is 2.76 plus $S_2$.

*Table 2*

| Lens | N | V | D | Radii | Thicknesses |
|---|---|---|---|---|---|
| 1 | 1.6170 | 54.9 | 25.0 | $R_1 = +53.21$ | $T_1 = 3.5$ |
|   |        |      |      | $R_2 = -100.0$ | $S_1 = 0.76$ |
| 2 | 1.6170 | 36.6 | 25.0 | $R_3 = -100.0$ | $T_2 = 1.5$ |
|   |        |      |      | $R_4 = +286.0$ | $S_2$ varies, 2.80 to 25.43 |
| 3 | 1.5230 | 50.5 | 13.5 | $R_5 = -47.5$ | $T_3 = 1.65$ |
|   |        |      |      | $R_6 = +26.0$ | $S_3$ varies, 28.66 to 6.03 |
| 4 | 1.4980 | 67.0 | 13.5 | $R_7 = +26.0$ | $T_4 = 5.45$ |
|   |        |      |      | $R_8 = -65.0$ | $S_4$ varies, 5.56 to 28.19 |
| 5 | 1.6110 | 57.2 | 9.5 | $R_9 = +12.99$ | $T_5 = 3.16$ |
|   |        |      |      | $R_{10} = -15.78$ | $S_5 = 0.4$ |
| 6 | 1.6350 | 35.2 | 9.5 | $R_{11} = -11.81$ | $T_6 = 1.0$ |
|   |        |      |      | $R_{12} = \infty$ | $S_6 = 2.10$ |
| 7 | 1.6490 | 33.8 | 9.0 | $R_{13} = \infty$ | $T_7 = 1.0$ |
|   |        |      |      | $R_{14} = +9.31$ | $S_7 = 0.5$ |
| 8 | 1.6227 | 57.0 | 9.0 | $R_{15} = +13.0$ | $T_8 = 3.3$ |
|   |        |      |      | $R_{16} = -13.0$ |  |

A lens constructed in accordance with the specific example in Table 2 has an equivalent focal length which varies from 11 mm., when the front member is adjusted to its rearmost or wide angle position (with $S_4$ at the minimum limit of its range) to a focal length of 30 mm., when the front member is adjusted to its most forward or telephoto position (with $S_4$ at the maximum limit of its range). When the front member is adjusted to an intermediate position yielding an equivalent focal length of 15.75 mm., this may be called the normal position of the lens. The zooming adjustment, for changing the equivalent focal length of the entire system, is accomplished by moving elements 1, 2, and 4 axially together in unison, in fixed relation to each other, all other elements remaining axially stationary. The lens works well at any intermediate position, and produces a smooth continuous zoom effect through the entire range of this adjustment, not just at the three positions which have been designated as the telephoto position, normal position, and wide angle position. Throughout the entire range of zooming adjustment or variation, the lens system works at a relative aperture of substantially $f: 1.8$. It covers a full angular field between 11.5 degrees, in the telephoto position, and 29.5 degrees, in the wide angle position. It gives excellent coverage on a motion picture film of the so-called 8 millimeter width.

The focusing adjustment, to focus on an object at a finite distance in front of the lens, should be carefully distinguished from the zooming adjustment or variable magnification adjustment, which is independent of the distance of the object, in practical operation. The focusing adjustment is made by moving the element 1 axially relative to elements 2 and 4, which always remain at a fixed distance from each other, both during focusing adjustment and during zooming adjustment. The spacing $S_1$ as given in Table 2 is the proper spacing when element 1 is in its infinity-focused position. To focus upon objects at closer distances, element 1 is moved forwardly relative to elements 2 and 4, in accordance with the equation given above, and the space $S_1$ increases accordingly.

In designing any specific embodiment of a lens system in accordance with this invention, the equivalent focal length ($F_{12}$) of the rear member is so chosen as to give the desired focal lengths for the complete system, within the desired range of variation. It is possible to vary the focal range of the front member by making proportionate changes of the radii, thicknesses, and spacings of all elements of the front member, to obtain a lens system whose focal lengths (maximum and minimum) may be either greater or less than those of the system disclosed as a specific example in Table 2. Thus although it has been stated that the linear dimensions in Table 2 are expressed in millimeters, they may be properly regarded as representing proportions rather than absolute dimensions.

The zooming accuracy can be affected by changing the relative powers of elements 3 and 4 and the front group (elements 1 and 2 together), or by changing the constant K which is the sum of the spaces $S_2$ and $S_3$. The space $S_4$ between element 4 and the rear member can be changed (either increased or decreased) to a substantial extent without adversely affecting the zooming accuracy. Thus the space $S_4$ may be increased, if desired, to a sufficient extent to accommodate an automatic photocell-controlled diaphragm in this space.

Other changes and variations from the specific example of Table 2 are possible, without departing from the invention, but the variations should preferably be kept substantially within the proportional limits outlined in Table 1.

Figure 2:
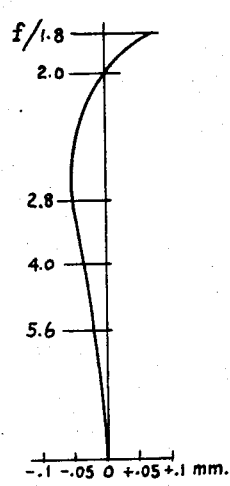
FIG. 2 is a graph illustrating the longitudinal spherical aberration of the lens system of the preferred embodiment when the parts are adjusted to the wide angle position.
Figure 3:
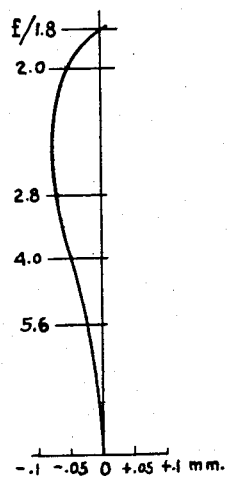
FIG. 3 is a similar graph when the parts are adjusted to the normal position.
Figure 4:
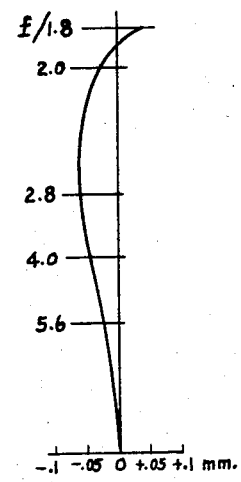
FIG. 4 is a similar graph for the telephoto position.
Figure 5:
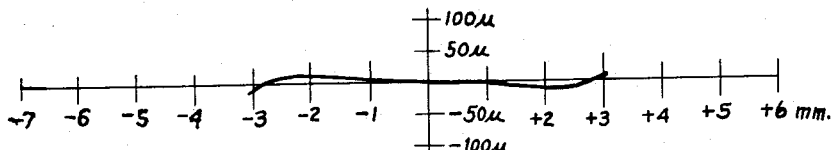
FIG. 5 is a graph illustrating the transverse spherical aberration when the parts are adjusted to the wide angle position.
Figure 6:
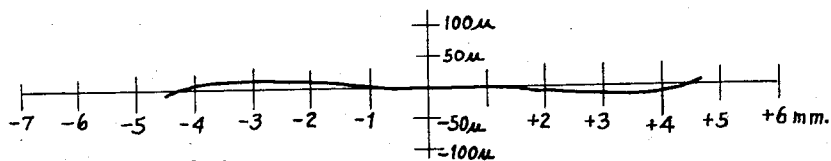
FIGS. 6 and 7 are similar graphs for the normal position and the telephoto position, respectively.
Figure 7:
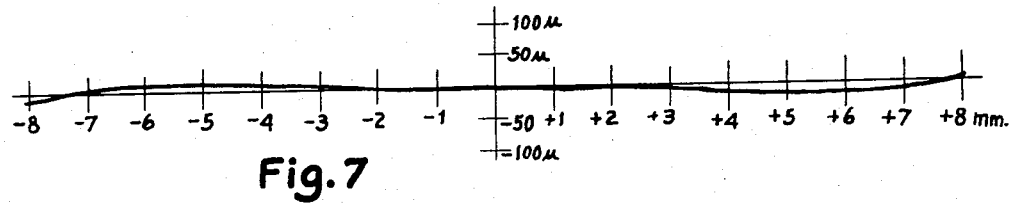
Figure 8:
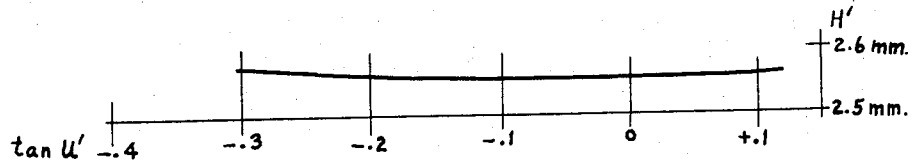
FIG. 8 is a graph illustrating the tangential oblique ray intercept curve for the lens system when the parts are adjusted to the wide angle position.
Figure 9:
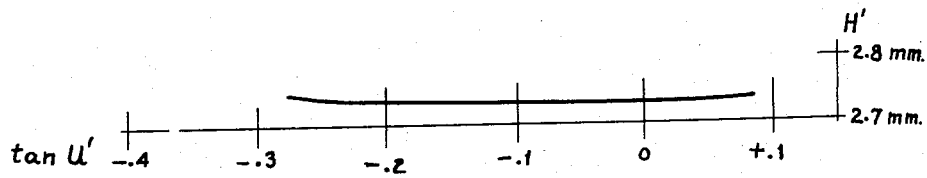
FIGS. 9 and 10 are similar graphs for the normal position and the telephoto position, respectively.
Figure 10:
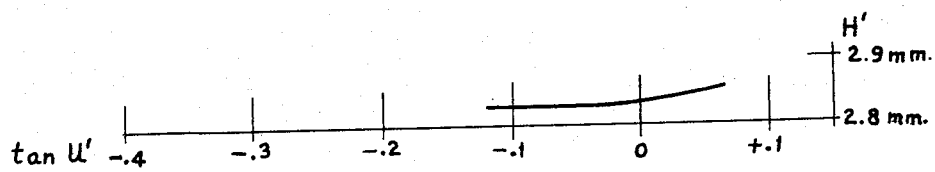

The aberration curves and ray intercept curves constituting FIGS. 2–10 of the drawings require no special comment, but will be readily understood by those skilled in the art, who will readily appreciate from these curves or graphs the excellent and improved results attained by a lens system in accordance with the specific example of Table 2.

What is claimed is:

1. A variable focal length lens system comprising four individual lens elements collectively constituting a front member and other lens elements collectively constituting a rear member, the first, second, and fourth elements (numbering them consecutively from front to rear) being axially movable together in unison relative to the third element and the rear member during adjustment of the lens system to vary the focal length thereof, while said third element and rear member remain axially fixed, the below mentioned characteristics of the four elements of the front member being substantially within the limits indicated in the following table:

$$+0.412F_9 < F_1 < +0.686F_9$$
$$-0.884F_9 < F_2 < -1.474F_9$$
$$-0.236F_9 < F_3 < -0.393F_9$$
$$+0.281F_9 < F_4 < +0.468F_9$$
$$+1.544F_{10} < F_9 < +2.574F_{10}$$
$$+0.647F_{11} < F_9 < +1.079F_{11}$$
$$+0.383F_9 < R_1 < +0.638F_9$$
$$-0.737F_9 < R_2 < -1.229F_9$$
$$-0.737F_9 < R_3 < -1.229F_9$$
$$+2.110F_9 < R_4 < +3.516F_9$$
$$+1.118F_3 < R_5 < +1.863F_3$$
$$-0.612F_3 < R_6 < -1.020F_3$$
$$+0.512F_4 < R_7 < +0.854F_4$$
$$-1.281F_4 < R_8 < -2.135F_4$$

wherein $F_1$ through $F_4$ respectively indicate the focal lengths of lens elements 1 through 4, $F_9$ indicates the equivalent focal length of elements 1 and 2 taken together, $F_{10}$ indicates the equivalent focal length of the entire front member when adjusted to its shortest facol length limit, $F_{11}$ indicates the equivalent focal length of the entire front member when adjusted to its longest focal length limit, R with a numerical subscript indicates the radius of curvature of a surface identified by the subscript, numbering the surfaces consecutively from front to rear, a plus focal length of an individual lens element indicates a positive power, a minus focal length thereof indicates a negative power, a plus radius indicates a surface convex toward the front, and a minus radius indicates a surface concave toward the front.

2. A variable focal length lens system comprising four individual lens elements collectively constituting a front member and four other lens elements collectively constituting a rear member, the first, second, and fourth elements (numbering them consecutively from front to rear) being axially movable together in unison relative to the third element and the rear member during adjustment of the lens system to vary the focal length thereof, while said third element and elements 5 through 8 constituting the four elements of the rear member remain axially fixed, the below mentioned characteristics of the respective elements being substantially within the limits indicated in the folowing table:

$$+0.412F_9 < F_1 < +0.686F_9$$
$$-0.884F_9 < F_2 < -1.474F_9$$
$$-0.236F_9 < F_3 < -0.393F_9$$
$$+0.281F_9 < F_4 < +0.468F_9$$
$$+1.544F_{10} < F_9 < +2.574F_{10}$$
$$+0.647F_{11} < F_9 < +1.079F_{11}$$
$$+0.383F_9 < R_1 < +0.638F_9$$
$$-0.737F_9 < R_2 < -1.229F_9$$
$$-0.737F_9 < R_3 < -1.229F_9$$
$$+2.110F_9 < R_4 < +3.516F_9$$
$$+1.118F_3 < R_5 < +1.863F_3$$
$$-0.612F_3 < R_6 < -1.020F_3$$
$$+0.512F_4 < R_7 < +0.854F_4$$
$$-1.281F_4 < R_8 < -2.135F_4$$
$$+0.525F_{12} < R_9 < +0.875F_{12}$$
$$-0.638F_{12} < R_{10} < -1.063F_{12}$$
$$-0.477F_{12} < R_{11} < -0.795F_{12}$$

$$+0.250F_{12} < R_{12} \leqq \infty$$
$$-0.250F_{12} < R_{13} \leqq \infty$$
$$+0.376F_{12} < R_{14} < +0.626F_{12}$$
$$+0.525F_{12} < R_{15} < +0.875F_{12}$$
$$-0.525F_{12} < R_{16} < -0.875F_{12}$$

wherein $F_1$ through $F_4$ respectively indicate the focal lengths of lens elements 1 through 4, $F_9$ indicates the equivalent focal length of elements 1 and 2 taken together, $F_{10}$ indicates the equivalent focal length of the entire front member when adjusted to its shortest focal length limit, $F_{11}$ indicates the equivalent focal length of the entire front member when adjusted to its longest focal length limit, $F_{12}$ indicates the equivalent focal length of the entire rear member, R with a numerical subscript indicates the radius of curvature of a surface identified by the subscript, numbering the surfaces consecutively from front to rear, a plus focal length of an individual lens element indicates a positive power, a minus focal length thereof indicates a negative power, a plus radius indicates a surface convex toward the front, and a minus radius indicates a surface concave toward the front.

3. A construction as defined in claim 1, in which the radii $R_2$ and $R_3$ are numerically equal to each other and of the same sign and are spaced from each other by an air gap, and in which the materials from which elements 1 and 2 are made have substantially the same refractive indices and substantially different dispersive indices.

4. A construction as defined in claim 3, in which element 1 is movable axially with respect to element 2 for purposes of focusing the lens system upon objects at different finite distances without substantial change in the equivalent focal length of the system.

5. A variable focal length lens system comprising a front member of four individual lens elements all air spaced from each other and serving to form a real image in a substantially fixed image plane, which may constitute an object for a rear member of the lens system, element 3 (numbering the elements consecutively from front to rear) being axially fixed and elements 1, 2 and 4 being axially movable in unison to vary the equivalent focal length of the entire system, the characteristics of the elements of the front member and their spatial relationship to each other being substantially in the proportions indicated by the data in the following table:

| Lens | N | V | Radii | Thicknesses |
| --- | --- | --- | --- | --- |
| 1 | 1.6170 | 54.9 | $R_1=+53.21$ | $T_1=3.5$ |
|   |        |      | $R_2=-100.0$ | $S_1=0.76$ |
| 2 | 1.6170 | 36.6 | $R_3=-100.0$ | $T_2=1.5$ |
|   |        |      | $R_4=+286.0$ | $S_2$ varies |
| 3 | 1.5230 | 50.5 | $R_5=-47.5$ | $T_3=1.65$ |
|   |        |      | $R_6=+26.0$ | $S_3$ varies |
| 4 | 1.4980 | 67.0 | $R_7=+26.0$ | $T_4=5.45$ |
|   |        |      | $R_8=-65.0$ |  | wherein the refractive indices of the respective lens elements with reference to the spectral D line of sodium are given in column N, their corresponding dispersive indices are given in column V, the radii of curvature of the respective surfaces are indicated by R with a numerical subscript identifying the particular surface, numbering the surfaces consecutively from front to rear, with plus and minus values of R indicating surfaces respectively convex and concave toward the front, the axial thicknesses T of the respective lens elements and the axial spacings S between successive elements being individually identified by numerical subscripts corresponding to the individual thicknesses and spaces when separately and consecutively numbered from front to rear.

6. A variable focal length lens system comprising eight individual lens elements all air spaced from each other and respectively identified by numbering them consecutively from front to rear, elements 3 and 5 through 8 remaining axially fixed with respect to each other during adjustment to vary the equivalent focal length of the entire system, elements 1, 2, and 4 being axially movable in unison during such adjustment, the characteristics of the elements and their spatial relationship to each other being substantially in the proportions indicated by the data in the following table:

| Lens | N | V | Radii | Thicknesses |
| --- | --- | --- | --- | --- |
| 1 | 1.6170 | 54.9 | $R_1=+53.21$ | $T_1=3.5$ |
|   |        |      | $R_2=-100.0$ | $S_1=0.76$ |
| 2 | 1.6170 | 36.6 | $R_3=-100.0$ | $T_2=1.5$ |
|   |        |      | $R_4=+286.0$ | $S_2$ varies |
| 3 | 1.5230 | 50.5 | $R_5=-47.5$ | $T_3=1.65$ |
|   |        |      | $R_6=+26.0$ | $S_3$ varies |
| 4 | 1.4980 | 67.0 | $R_7=+26.0$ | $T_4=5.45$ |
|   |        |      | $R_8=-65.0$ | $S_4$ varies |
| 5 | 1.6110 | 57.2 | $R_9=+12.99$ | $T_5=3.16$ |
|   |        |      | $R_{10}=-15.78$ | $S_5=0.4$ |
| 6 | 1.6350 | 35.2 | $R_{11}=-11.81$ | $T_6=1.0$ |
|   |        |      | $R_{12}=\infty$ | $S_6=2.10$ |
|   |        |      | $R_{13}=\infty$ |  |
| 7 | 1.6490 | 33.8 | $R_{14}=+9.31$ | $T_7=1.0$ |
|   |        |      | $R_{15}=+13.0$ | $S_7=0.5$ |
| 8 | 1.6227 | 57.0 | $R_{16}=-13.0$ | $T_8=3.3$ | wherein the refractive indices of the respective lens elements with reference to the spectral D line of sodium are given in column N, their corresponding dispersive indices are given in column V, the radii of curvature of the respective surfaces are indicated by R with a numerical subscript identifying the particular surface, numbering the surfaces consecutively from front to rear, with plus and minus values of R indicating surfaces respectively convex and concave toward the front, the axial thicknesses T of the respective lens elements and the axial spacings S between successive elements being individually identified by numerical subscripts corresponding to the individual thicknesses and spaces when separately and consecutively numbered from front to rear.

References Cited in the file of this patent

UNITED STATES PATENTS

| 2,718,817 | Back et al. | Sept. 27, 1955 |
| 2,925,010 | Turula et al. | Feb. 16, 1960 |
| 3,000,259 | Turula et al. | Sept. 19, 1961 |
| 3,000,260 | Turula et al. | Sept. 19, 1961 |